(12) United States Patent
Watanabe

(10) Patent No.: US 7,649,300 B2
(45) Date of Patent: Jan. 19, 2010

(54) ELECTROMAGNETIC ACTUATOR AND CAMERA BLADE DRIVING DEVICE

(75) Inventor: Nobuaki Watanabe, Tokyo (JP)

(73) Assignee: Nidec Copal Corporation, Tokyo (JP)

( * ) Notice: Subject to any disclaimer, the term of this patent is extended or adjusted under 35 U.S.C. 154(b) by 178 days.

(21) Appl. No.: 11/384,513

(22) Filed: Mar. 21, 2006

(65) Prior Publication Data
US 2006/0220490 A1    Oct. 5, 2006

(30) Foreign Application Priority Data
Mar. 31, 2005  (JP)  ............................. 2005-103030

(51) Int. Cl.
*H02K 1/22*    (2006.01)
(52) U.S. Cl. .................. 310/261; 310/156.01; 310/15; 310/36; 396/463; 396/508; 396/469; 396/468; 396/467; 396/466; 396/465; 396/464
(58) Field of Classification Search .................. 310/261, 310/156.01, 36, 15, 156.07, 156.38, 156.68, 310/156.72, 37–39; 396/463, 36, 508; G08B 9/08; H02K 1/22
See application file for complete search history.

(56) References Cited

U.S. PATENT DOCUMENTS

| 3,234,436 A * | 2/1966 | Bieger ........................ 335/268 |
| 3,735,303 A * | 5/1973 | Harden ....................... 335/272 |
| 4,004,168 A * | 1/1977 | Haydon ........................ 310/41 |
| 5,334,893 A * | 8/1994 | Oudet et al. ................... 310/38 |
| 5,689,746 A * | 11/1997 | Akada et al. ................. 396/508 |
| 6,123,468 A * | 9/2000 | Furlani et al. ............... 396/463 |
| 6,705,776 B2 * | 3/2004 | Watanabe .................... 396/463 |
| 2002/0127013 A1 * | 9/2002 | Mizumaki et al. ........... 396/463 |
| 2004/0062543 A1 * | 4/2004 | Miyawaki .................... 396/463 |
| 2004/0065243 A1 * | 4/2004 | Ferrari ........................ 114/143 |
| 2004/0183383 A1 * | 9/2004 | Strobl ......................... 310/36 |
| 2004/0222709 A1 * | 11/2004 | Naganuma et al. ............ 310/36 |
| 2006/0255664 A1 * | 11/2006 | Kraus et al. ................... 310/36 |

FOREIGN PATENT DOCUMENTS

| JP | 7-13215 | 1/1995 |
| JP | 9-152645 | 6/1997 |
| JP | 2001-327143 | 11/2001 |

* cited by examiner

*Primary Examiner*—Quyen Leung
*Assistant Examiner*—John K Kim
(74) *Attorney, Agent, or Firm*—Wenderoth, Lind & Ponack, L.L.P.

(57) ABSTRACT

An electromagnetic actuator includes a rotor rotatable within a predetermined angular range, a magnetizing coil, and a yoke having an arcuate surface facing the rotor, and first and second magnetic-pole parts that have mutually different magnetic poles upon energizing the coil. The rotor includes a magnetized rotor part defining the outer peripheral surface of the rotor and magnetized to have different magnetic poles, a non-magnetized driving pin rotatable with the magnetized rotor part, and a protrusion part protruding radially from the rotor and facing the first or second magnetic-pole part while being magnetized to have the same magnetic pole as the outer peripheral surface of the rotor. The surface of the rotor that faces the yoke and that exerts a magnetic action is increased due to the inclusion of the protrusion part, and hence a desired maintaining force and driving torque can be obtained.

15 Claims, 8 Drawing Sheets

ELECTROMAGNETIC ACTUATOR AND CAMERA BLADE DRIVING DEVICE

BACKGROUND OF THE INVENTION

1. Field of the Invention

The present invention relates to an electromagnetic actuator that generates a driving force by an electromagnetic force. More specifically, the present invention relates to an electromagnetic actuator that includes a rotor having a magnetized outer peripheral surface and a yoke that forms a magnetic-pole part facing the outer peripheral surface of the rotor and that is used when a blade member of a camera, such as a shutter blade or a diaphragm blade, is driven, and relates to a camera blade driving device using the electromagnetic actuator.

2. Description of the Related Art

A conventionally known electromagnetic actuator mounted on, for example, a shutter device of a camera includes a cylindrical rotor that is supported rotatably with respect to a base plate having an exposure aperture and that is magnetized into N and S-poles by bisecting its outer peripheral surface in the circumferential direction, a nearly U-shaped yoke that has a magnetic-pole part disposed to face the outer peripheral surface of the rotor, and a magnetizing coil wound around the yoke (see Japanese Unexamined Patent Publication Nos. H9-152645 and 2001-327143, for example).

An other conventionally known electromagnetic actuator includes a cylindrical rotor that is supported rotatably with respect to a base plate having an exposure aperture and that is magnetized into N- and S-poles by bisecting its outer peripheral surface in the circumferential direction and a protrusion part that is protruded in the circumferential direction with respect to the rotor, in which the protrusion part is fixed so as to be rotatable together with the rotor and in which the rotational range of the rotor is restricted by bringing the protrusion part into contact with a stopper formed on the base plate (see Japanese Unexamined Patent Publication No. H7-13215, for example).

Meanwhile, correspondingly to a reduction in size of, for example, a digital camera, an electromagnetic actuator mounted on the digital camera is required to be reduced in size. If the electromagnetic actuator is merely reduced in size without changing the conventional structure, the magnetized cylindrical rotor becomes small in size, and it becomes difficult to sufficiently secure a driving torque generated by the rotor during energization and a magnetic attraction force generated during non-energization. Accordingly, when the electromagnetic actuator is used as a driving source that drives a shutter blade, etc., it becomes difficult to stably drive the shutter blade and hold this at a predetermined position.

SUMMARY OF THE INVENTION

The present invention has been made in consideration of these circumstances. It is therefore an object of the present invention to provide an electromagnetic actuator that is capable of securing a desired driving torque, a desired magnetic attraction force, etc., while being reduced in size and that is capable of exerting a stable driving force or a stable maintaining force when the electromagnetic actuator is used as a driving source that drives a blade member of a camera, such as a shutter blade, a diaphragm blade, an ND filter blade, or other filter blades, and provide a camera blade driving device using the electromagnetic actuator.

The electromagnetic actuator of the present invention that achieves the above-mentioned object includes a rotor that has a cylindrical outer peripheral surface and that is capable of rotating within a predetermined angular range, a magnetizing coil, and a yoke that has a circular arc surface facing the outer peripheral surface of the rotor, a first magnetic-pole part, and a second magnetic-pole part. The first and second magnetic-pole parts generate mutually different magnetic poles by energizing the coil. The rotor includes a magnetized rotor part that defines the outer peripheral surface of the rotor and that is magnetized to have different magnetic poles in a circumferential direction, a driving pin that is not magnetized so as to rotate together with the magnetized rotor part, and a protrusion part that is protruded in a radial direction from the outer peripheral surface of the rotor while being magnetized to have the same magnetic pole as the outer peripheral surface of the rotor and that faces the first magnetic-pole part or the second magnetic-pole part.

According to this structure, the rotor is provided with the protrusion part that is protruded from the outer peripheral surface of the magnetized rotor part and that is magnetized into the same magnetic pole as the outer peripheral surface thereof, in addition to the magnetized rotor part and the driving pin that is not magnetized. This protrusion part can face the first magnetic-pole part or the second magnetic-pole part of the yoke. Therefore, the rotor is increased in the surface that faces the yoke and that exerts a magnetic action.

Accordingly, a great magnetic attraction force is generated between the protrusion part and the first magnetic-pole part or the second magnetic-pole part so that a stable maintaining force can be obtained when the coil is not energized, whereas a great repulsion force by an electromagnetic force is generated between the protrusion part and the first magnetic-pole part or the second magnetic-pole part so that a stable driving torque can be obtained when the coil is energized. On the other hand, since the driving pin is formed not to be magnetized, an excessive magnetic attraction force and an excessive driving torque can be prevented from being generated, so that a smooth, stable rotational operation can be performed. Therefore, it is possible to obtain an electromagnetic actuator that generates a desired maintaining force and a desired driving torque while the electromagnetic actuator is reduced in size in the direction of the rotational axis of the rotor.

Preferably, in the electromagnetic actuator structured as above, the magnetized rotor part has an N-pole outer peripheral surface and an S-pole outer peripheral surface that are obtained by being bisected in the circumferential direction, and the protrusion part is protruded from one of the N-pole outer peripheral surface and the S-pole outer peripheral surface.

According to this structure, what is required is to provide the conventional rotor with the protrusion part formed on the outer peripheral surface and magnetize the protrusion part so that the protrusion part has the same magnetic pole as the outer peripheral surface. Therefore, it is possible to easily set a necessary driving torque and a necessary magnetic attraction force while simplifying the structure.

The camera blade driving device of the present invention that achieves the above-mentioned object includes a base plate having an exposure aperture, a blade member provided so as to be movable between a position facing the aperture and a position retreating from the aperture, and a driving source that drives the blade member. The driving source is one of the electromagnetic actuators structured as above.

According to this structure, since the electromagnetic actuator described above is employed as a driving source, a sufficient driving force is outputted from the rotor, so that the blade member is driven stably and reliably at a desired timing, and is held at a predetermined position (for example, a position facing the aperture or a position retreating from the aperture) while the device is reduced in size in the direction of the rotational axis of the rotor.

DETAILED DESCRIPTION OF THE PREFERRED EMBODIMENTS

Embodiments of the present invention will be herein after described with reference to the accompanying drawings.

FIG. 1 to FIG. 6 show an embodiment in which an electromagnetic actuator according to the present invention is applied to a camera blade driving device.

Figure 1:
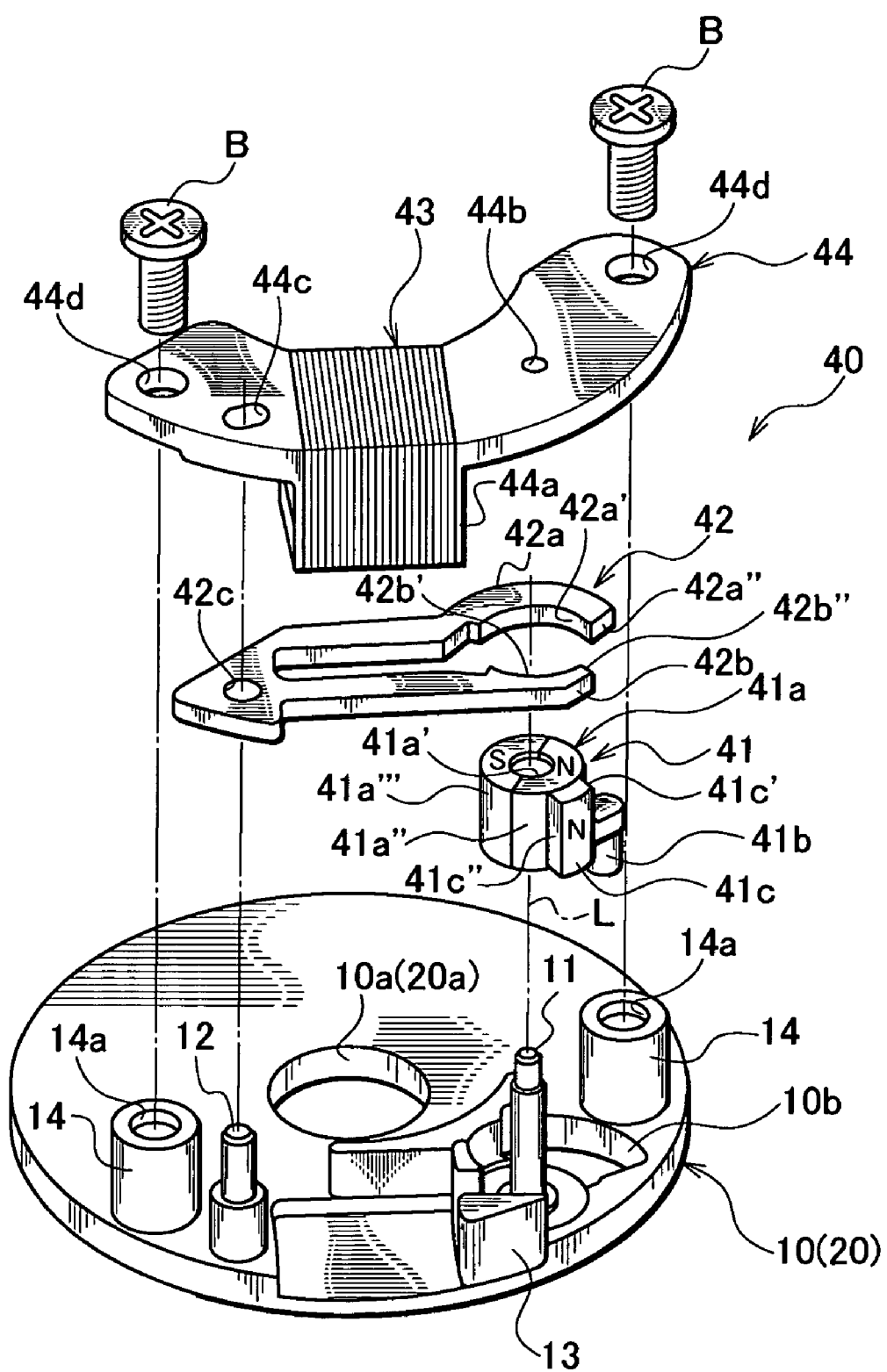
FIG. 1 is an exploded perspective view showing an embodiment of an electromagnetic actuator according to the present invention.
Figure 2:
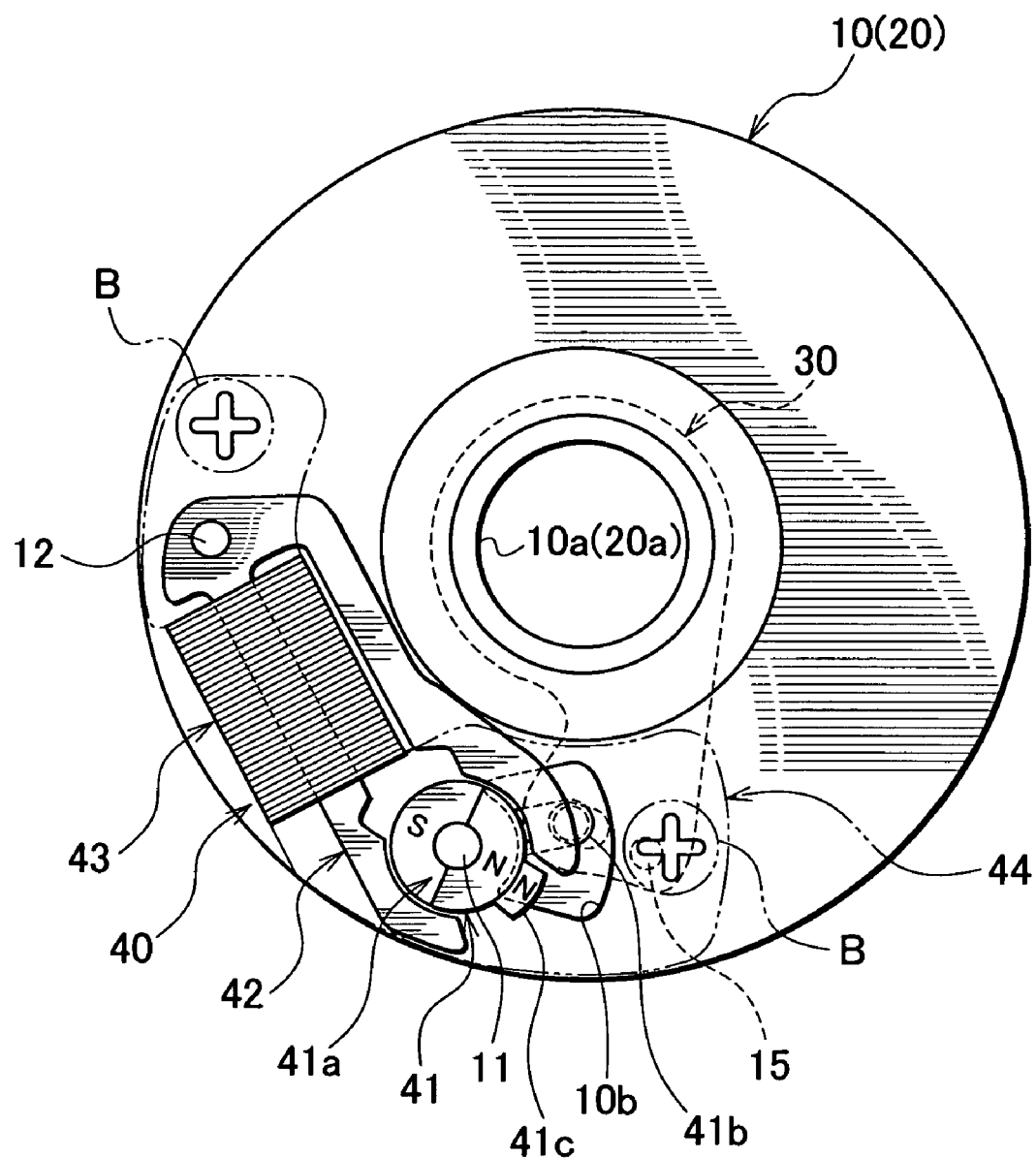
FIG. 2 is a plan view showing an embodiment of a camera blade driving device using the electromagnetic actuator according to the present invention.
Figure 3:
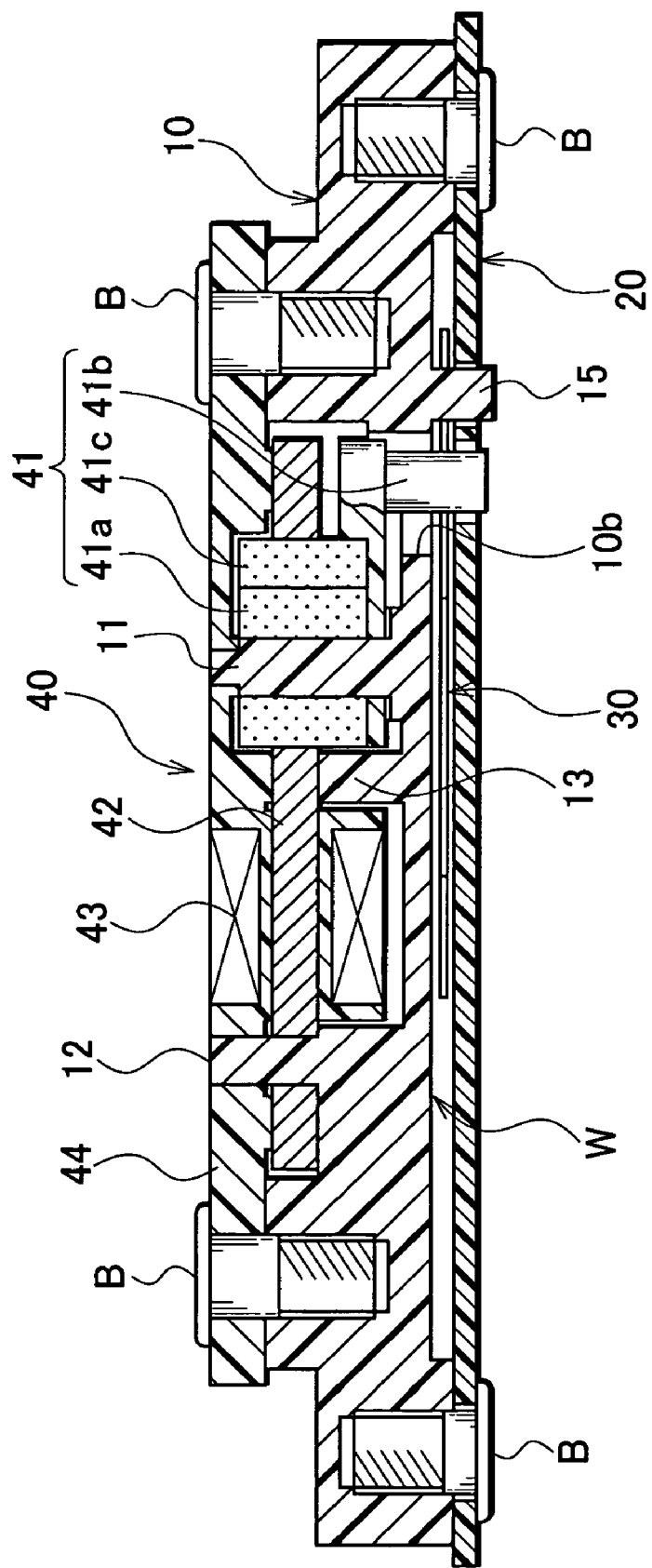
FIG. 3 is an expanded sectional view showing a part of the camera blade driving device of FIG. 2.

As shown in FIG. 1 to FIG. 3, the camera blade driving device includes a main plate 10 and a back plate 20 that constitute a base plate having exposure apertures 10a and 20a, a blade member 30 supported by the main plate 10 movably between a position facing the apertures 10a and 20a and a position retreating from the apertures 10a and 20a, and an electromagnetic actuator 40 serving as a driving source that drives the blade member 30.

As shown in FIG. 1 to FIG. 3, the main plate 10 has the circular exposure aperture 10a, a supporting shaft 11 that rotatably supports a rotor 41 described later, a substantially fan-shaped through-hole lob, a positioning pin 12 and a positioning projection 13 both of which position a yoke 42 described later, connection parts 14 each of which has a screw hole 14a into which a screw B is screwed, and a supporting shaft 15 that rotatably supports the blade member 30.

As shown in FIG. 3, the back plate 20 is connected to an end surface on the reverse side of the main plate 10 with a predetermined gap there between by means of the screws B, and defines a blade chamber W that rotatably contains the blade member 30.

Figure 5:
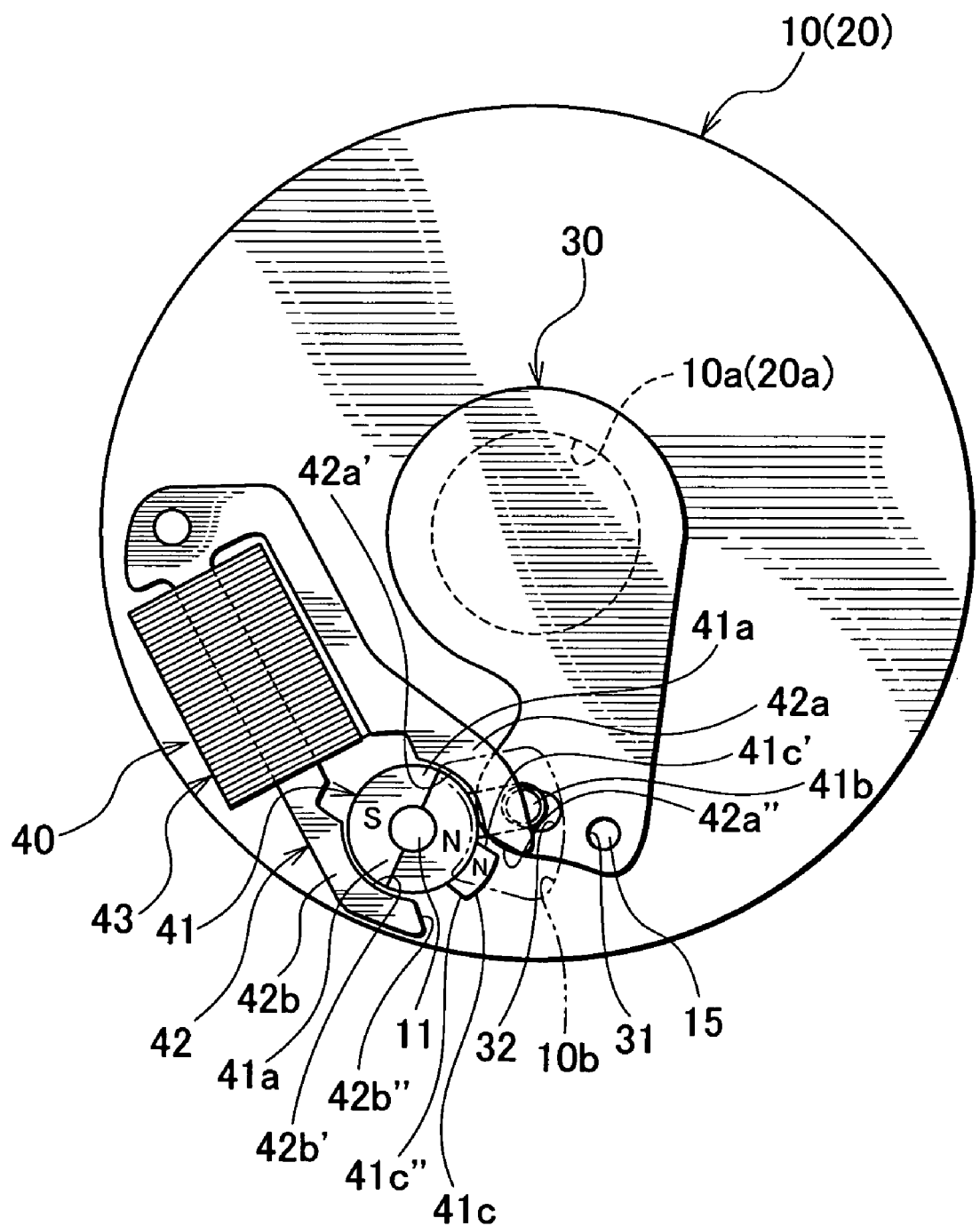
FIG. 5 is a plan view for explaining the operation of the camera blade driving device, showing a state in which a blade member occupies a position facing an aperture.
Figure 6:
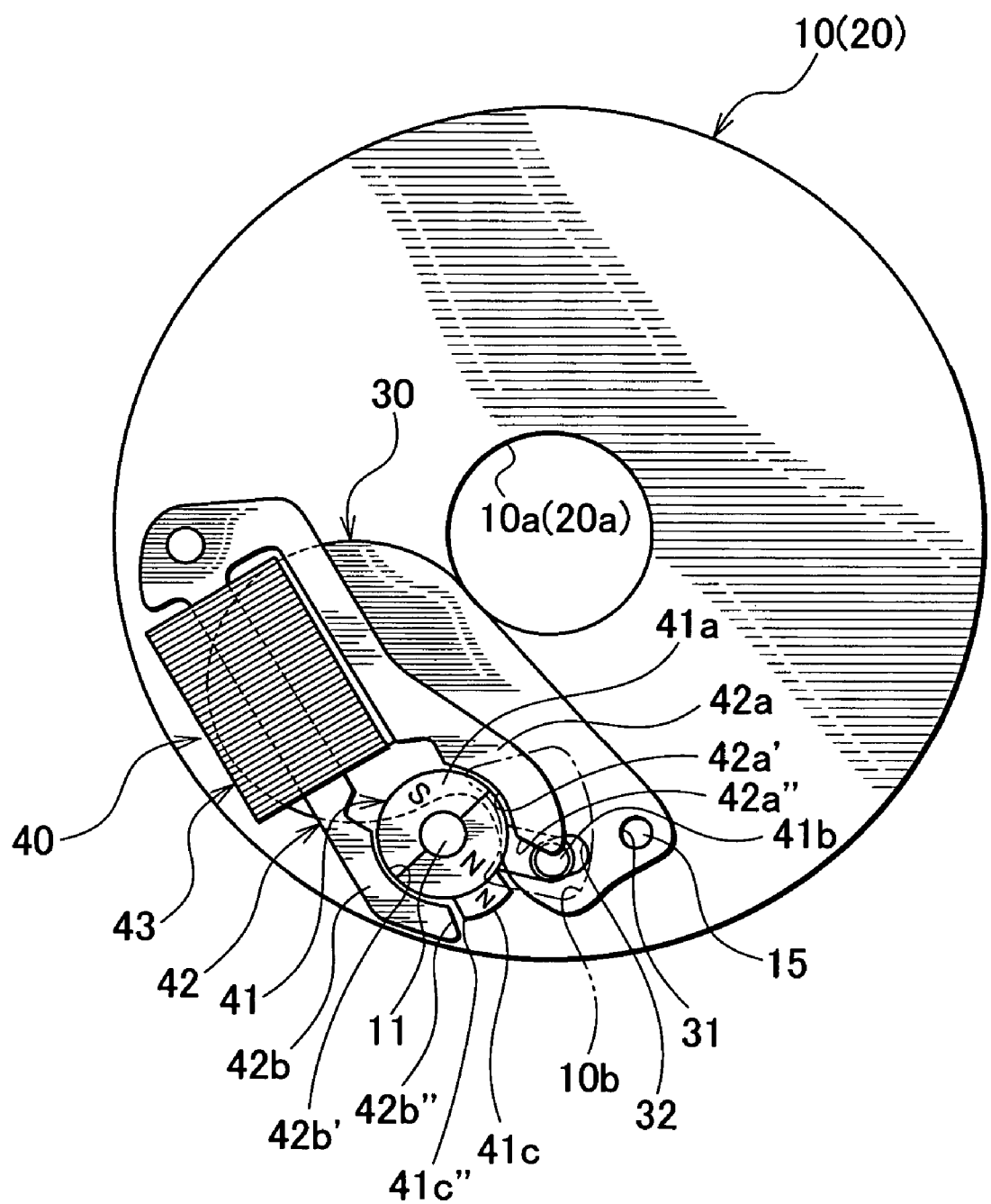
FIG. 6 is a plan view for explaining the operation of the camera blade driving device, showing a state in which the blade member occupies a position retreating from the aperture.

As shown in FIG. 5 and FIG. 6, the blade member 30 has a circular hole 31 into which the supporting shaft 15 is inserted and a long hole 32 into which a driving pin 41b described later is inserted.

The blade member 30 is reciprocated between a position facing the apertures 10a and 20a shown in FIG. 5 and a position retreating from the apertures 10a and 20a shown in FIG. 6 by reciprocating the driving pin 41b.

Various blade members, such as a shutter blade made of a shading plate, an ND (Neutral Density) filter blade by which the quantity of light passing therethrough is reduced, or a filter blade that cuts off infrared light, can be used as the blade member 30.

As shown in FIG. 1 to FIG. 3, the electromagnetic actuator 40 is made up of the rotor 41 rotatably supported by the main plate 10, the substantially U-shaped yoke 42, a magnetizing coil 43, and a presser plate 44.

As shown in FIG. 1 to FIG. 3, the rotor 41 is shaped like a cylinder, and is made up of a magnetized rotor part 41a that defines an N-pole outer peripheral surface 41a" and an S-pole outer peripheral surface 41a'" that are magnetized to have mutually different magnetic poles by being bisected with a boundary plane passing through a through-hole 41a', through which the supporting shaft 11 passes, and a rotational axis L as the boundary there between, the driving pin 41b that is not magnetized and that is rotated together with the magnetized rotor part 41a, and a protrusion part 41c that is magnetized to have an N-pole and that is protruded from the N-pole outer peripheral surface 41a" radially outwardly. The driving pin 41b includes not only a part that is connected to the blade member 30 but also an arm part extending in a horizontal direction (i.e., radially outwardly) from the bottom of the magnetized rotor part 41a.

The magnetized rotor part 41a is formed to define a cylindrical, outer peripheral surface. The outer peripheral surface thereof is bisected in the circumferential direction by the plane passing through the rotational axis L, thereby forming the N-pole outer peripheral surface 41a" magnetized to have an N-pole and the S-pole outer peripheral surface 41a'" magnetized to have an S-pole.

The driving pin 41b is molded integrally with the magnetized rotor part 41a, and serves to transmit a rotational driving force of the rotor 41 to the outside. The driving pin 41b is made of, for example, a resinous material so as not to be magnetized.

The protrusion part 41c is protruded in a radial direction from the N-pole outer peripheral surface 41a", and is magnetized into an N-pole that is the same as the N-pole outer peripheral surface 41a". Both end surfaces 41c' and 41c" in the circumferential direction thereof are formed to face a first magnetic-pole part 42a (end surface 42a') and a second magnetic-pole part 42b (end surface 42b"), which are described later, of the yoke 42, respectively.

As shown in FIG. 5, when the rotor 41 is positioned at a counterclockwise rotational end, the driving pin 41b comes into contact with a stopper (not shown) at a rotational end, and, as a result, the end surface 41c' frontally faces the end surface 42a" of the first magnetic-pole part 42a described later without being in contact therewith. On the other hand, as shown in FIG. 6, when the rotor 41 is positioned at a clockwise rotational end, the driving pin 41b comes into contact with a stopper (not shown) at an opposite rotational end, and, as a result, the end surface 41c" frontally faces the end surface 42b" of the second magnetic-pole part 42b described later without being in contact therewith.

As shown in FIG. 1, the yoke 42 is bent substantially in the shape of the letter U, and is made up of the first magnetic-pole part 42a that is formed at an end of the yoke 42 and that defines a circular arc surface 42a' and the end surface 42a", the second magnetic-pole part 42b that is formed at the other end of the yoke 42 and that defines a circular arc surface 42b' and the end surface 42b", and a positioning hole 42c that is formed in a bent part of the yoke 42.

The end surface 42a'' of the first magnetic-pole part 42a and the end surface 42b'' of the second magnetic-pole part 42b serve to generate a magnetic attraction force and a repulsion force at the protrusion part 41c of the rotor 41 (i.e., between the end surfaces 41c' and 41c'').

As shown in FIG. 1, the coil 43 is wound around a bobbin part 44a of the presser plate 44 described later.

As shown in FIG. 1, the presser plate 44 is formed like a flat plate, and is formed integrally with the bobbin part 44a. The presser plate 44 has, at both sides thereof, fitting holes 44b and 44c through which the supporting shaft 11 and the positioning pin 12 of the main plate 10 pass and holes 44d through each of which a screw B passes.

A description will be given of the operation of the thus structured electromagnetic actuator 40 and the operation of the camera blade driving device with reference to FIG. 4A to FIG. 6.

Figure 4A:
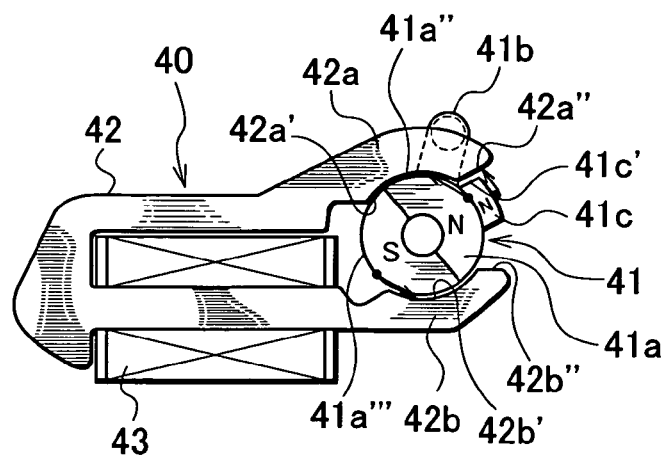
FIG. 4A, FIG. 4B, FIG. 4C, and FIG. 4D are plan views for explaining the operation of the electromagnetic actuator of FIG. 1, each showing an operational state.

First, when the rotor 41 is situated at a counterclockwise rotational end in a state of not energizing the coil 43 as shown in FIG. 4A, the rotor 41 is in contact with the stopper at a position where the boundary line between the magnetic poles of the magnetized rotor part 41a deviates from the intermediate position of each of the circular arc surfaces 42a' and 42b'. Therefore, a magnetic attraction force is generated between the N-pole outer peripheral surface 41a'' and the first magnetic-pole part 42a (the circular arc surface 42a'), between the S-pole outer peripheral surface 41a''' and the second magnetic-pole part 42b (the circular arc surface 42b'), and between the protrusion part 41c (the end surface 41c') and the end surface 42a'' of the first magnetic-pole part 42a. Therefore, the rotor 41 is positioned by the stopper (not shown) at the counterclockwise rotational end, and is reliably held thereby.

This state corresponds to a state in which the blade member 30 is set at a position facing the apertures 10a and 20a, as shown in FIG. 5, in the camera blade driving device.

Figure 4B:
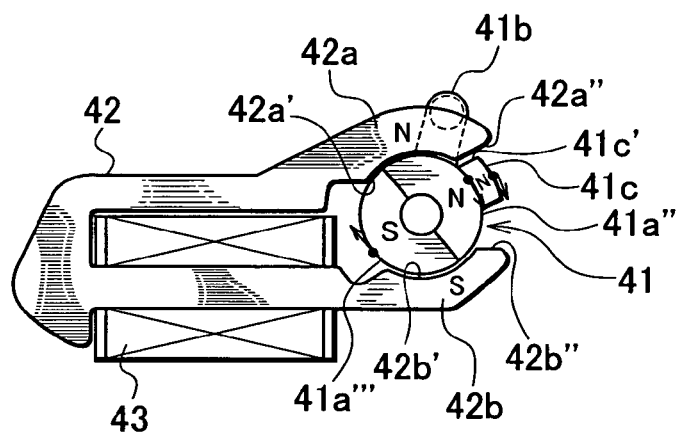

When an electric current is passed through the coil 43 in a predetermined direction in this state, an N-pole is generated in the first magnetic-pole part 42a, and an S-pole is generated in the second magnetic-pole part 42b as shown in FIG. 4B.

Accordingly, a repulsion force is generated by an electromagnetic force between the N-pole outer peripheral surface 41a'' and the first magnetic-pole part 42a (the circular arc surface 42a'), between the S-pole outer peripheral surface 41a''' and the second magnetic-pole part 42b (the circular arc surface 42b'), and between the protrusion part 41c (the end surface 41c') and the end surface 42a'' of the first magnetic-pole part 42a, so that the rotor 41 starts to rotate clockwise.

Figure 4C:
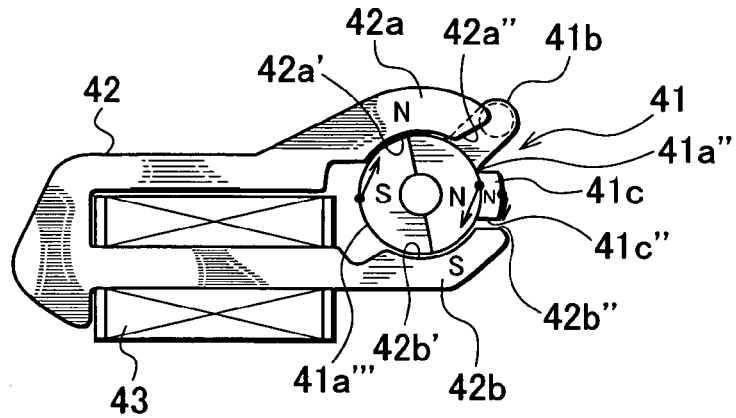

When the rotor 41 rotates clockwise, the repulsion force generated between the protrusion part 41c (the end surface 41c') and the end surface 42a'' of the first magnetic-pole part 42a greatly acts until the rotor 41 reaches an intermediate position of a rotational range (a working angle) thereof. After the rotor 41 goes beyond the intermediate position of the rotational range, an attraction force generated between the protrusion part 41c (the end surface 41c'') and the end surface 42b'' of the second magnetic-pole part 42b greatly acts. Therefore, the rotor 41 continues to rotate while maintaining a stable rotational force, and, as shown in FIG. 4C, the rotor 41 is positioned and stopped by the stopper (not shown) at a clockwise rotational end in a state in which the boundary line between the magnetic poles of the magnetized rotor part 41a deviates from the intermediate position of each of the circular arc surfaces 42a' and 42b'.

Figure 4D:
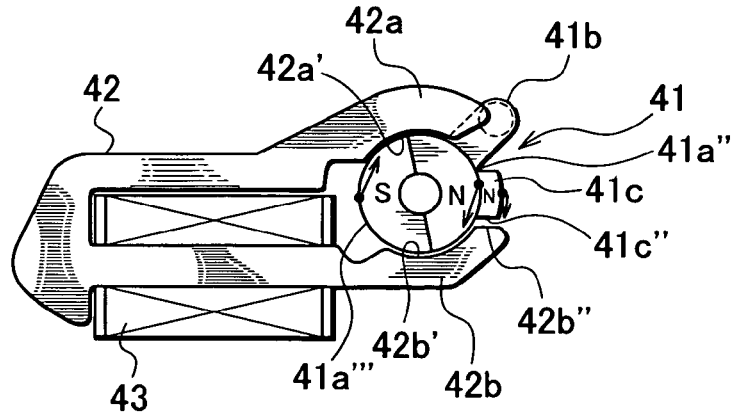

When an electric current stops being passed through the coil 43 in this state, the magnetic attraction force generated between the protrusion part 41c (the end surface 41c'') and the end surface 42b'' of the second magnetic-pole part 42b acts, and the magnetic attraction force generated between the N-pole outer peripheral surface 41a'' and the second magnetic-pole part 42b (the circular arc surface 42b') and between the S-pole outer peripheral surface 41a''' and the first magnetic-pole part 42a (the circular arc surface 42a') acts. As a result, the rotor 41 is reliably held at the clockwise rotational end as shown in FIG. 4D.

This state corresponds to a state in which the blade member 30 is set at the position retreating from the apertures 10a and 20a, as shown in FIG. 6, in the camera blade driving device.

On the other hand, when an electric current is passed through the coil 43 in an opposite direction, an opposite magnetic pole is generated in each of the first and second magnetic-pole parts 42a and 42b. Accordingly, the rotor 41 stably rotates in the counterclockwise direction while following an opposite path from the state of FIG. 4D, and is positioned and held at the counterclockwise rotational end shown in FIG. 4A.

At this time, in the camera blade driving device, the blade member 30 is moved from the position retreating from the apertures 10a and 20a shown in FIG. 6 to the position facing the apertures 10a and 20a shown in FIG. 5, and is positioned.

Since the rotor 41 is provided with the protrusion part 41c magnetized into the same magnetic pole as the N-pole outer peripheral surface 41a'' as described above, the rotor 41 can obtain a stable rotational force and a stable driving torque by means of the driving pin 41b. Additionally, the rotor 41 can generate a desired maintaining force (i.e., a magnetic attraction force) at the rotational ends on both sides thereof. Still additionally, when the electromagnetic actuator 40 is used as a driving source for the camera blade driving device, the blade member 30 can be driven smoothly and stably.

Still additionally, even if the driving pin 41b is disposed near the first magnetic-pole part 42a or the second magnetic-pole part 42b in the direction of the rotational axis of the rotor 41, neither an excessive magnetic attraction force nor an excessive driving torque is generated between the driving pin 41b and the magnetic-pole part 42a or 42b, because the driving pin 41b is not magnetized. Therefore, the electromagnetic actuator can perform a smooth, stable rotational operation, and can be reduced in size. The protrusion part 41c may be formed on the S-pole outer peripheral surface 41a'''.

Figure 7:
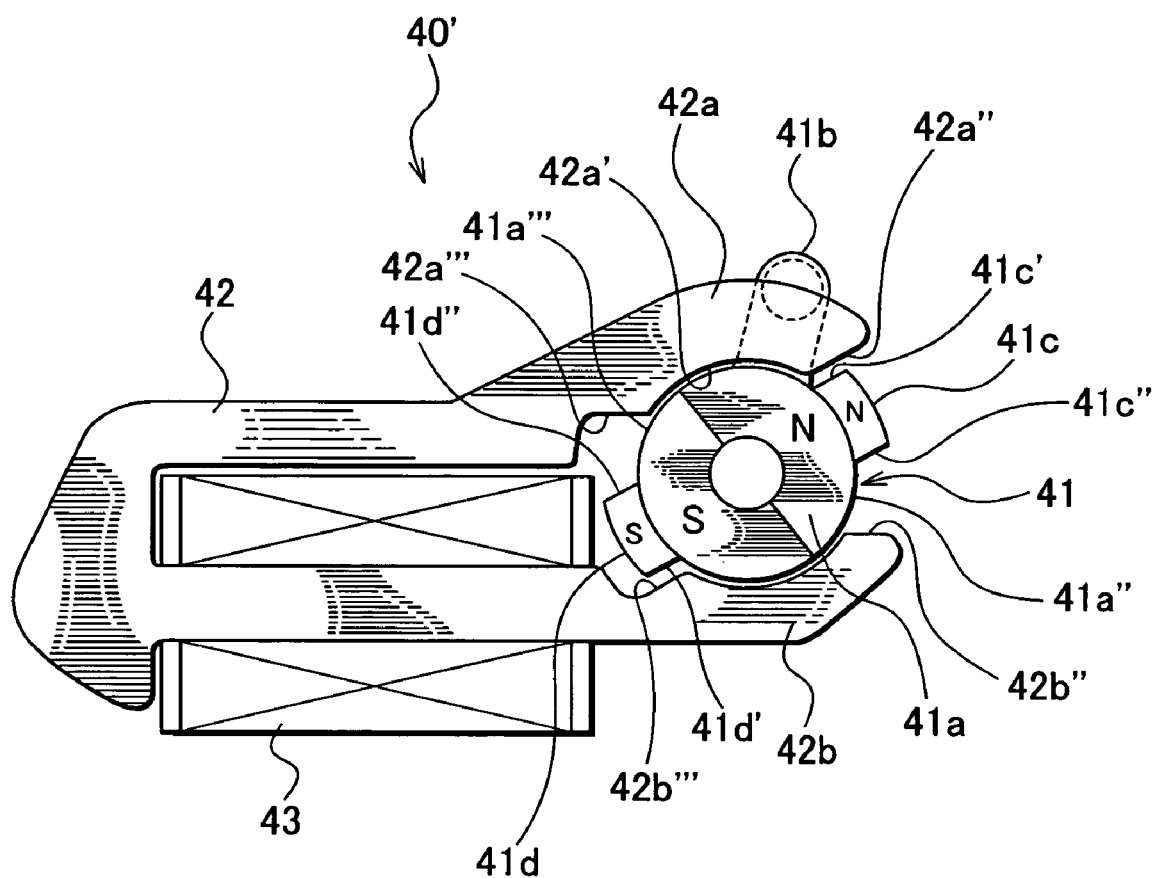
FIG. 7 is a plan view showing another embodiment of the electromagnetic actuator according to the present invention.
Figure 8A:
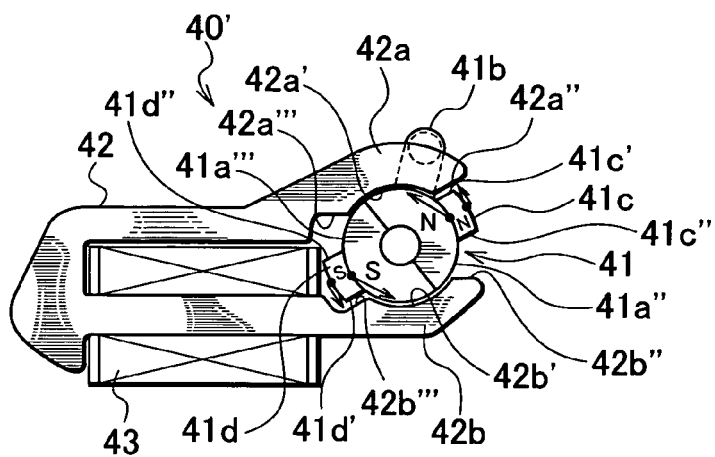
FIG. 8A, FIG. 8B, FIG. 8C, and FIG. 8D are plan views for explaining the operation of the electromagnetic actuator of FIG. 7, each showing an operational state.
Figure 8B:
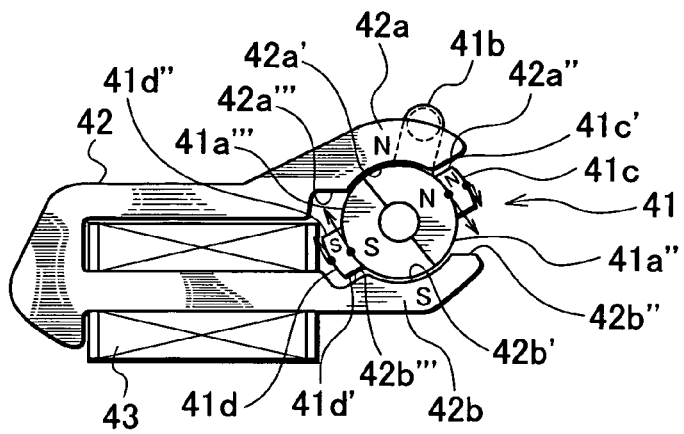
Figure 8C:
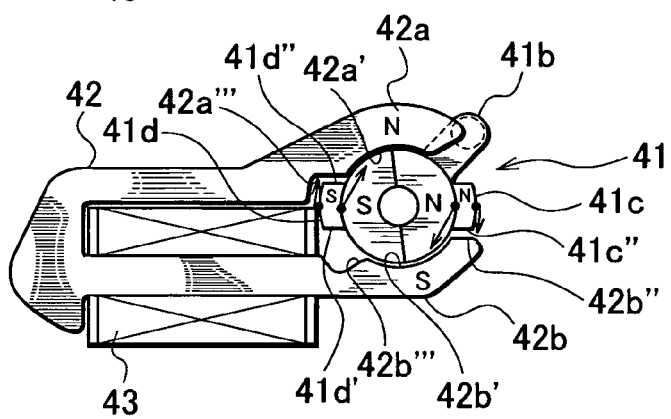
Figure 8D:
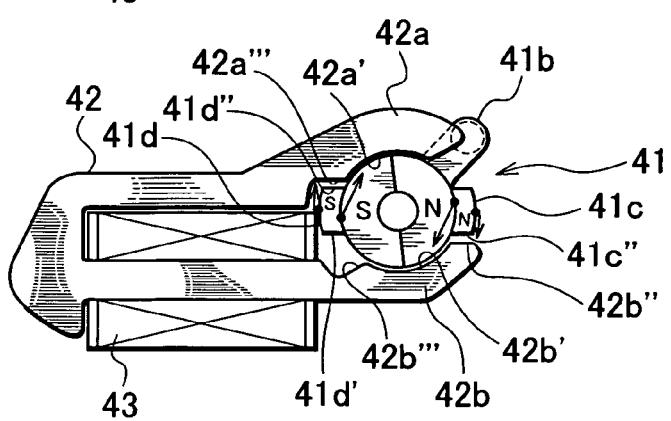

FIG. 7 to FIG. 8D show another embodiment of the electromagnetic actuator according to the present invention. This embodiment is the same as the above-described embodiment, except that the rotor and the yoke are partially modified. Therefore, the same reference character is given to the same structure as in the above-described embodiment, and a description of the same structure is omitted.

As shown in FIG. 7, in this electromagnetic actuator 40', the rotor 41 is additionally provided with a protrusion part 41d magnetized into an S-pole on the S-pole outer peripheral surface 41a''', and the yoke 42 additionally has end surfaces 42b''' and 42a''' that face both end surfaces 41d' and 41d'', respectively, of the protrusion part 41d.

The operation of the electromagnetic actuator 40' will be described with reference to FIG. 8A to FIG. 8D.

First, when the rotor 41 is positioned at the counterclockwise rotational end in a state of not energizing the coil 43 as shown in FIG. 8A, a magnetic attraction force is generated between the N-pole outer peripheral surface 41a'' and the first magnetic-pole part 42a (the circular arc surface 42a'), between the S-pole outer peripheral surface 41a''' and the second magnetic-pole part 42b (the circular arc surface 42b'), between the protrusion part 41c (the end surface 41c') and the end surface 42a'' of the first magnetic-pole part 42a, and between the protrusion part 41*d* (the end surface 41*d'*) and the end surface 42*b'''* of the second magnetic-pole part 42*b*. Therefore, the rotor 41 is positioned by the stopper (not shown) at the counterclockwise rotational end, and is reliably held thereby.

This state corresponds to a state in which the blade member 30 is set at the position facing the apertures 10*a* and 20*a*, as shown in FIG. 5, in the camera blade driving device.

When an electric current is passed through the coil 43 in a predetermined direction in this state, an N-pole is generated in the first magnetic-pole part 42*a*, and an S-pole is generated in the second magnetic-pole part 42*b* as shown in FIG. 8B.

Accordingly, a repulsion force is generated by an electromagnetic force between the N-pole outer peripheral surface 41*a''* and the first magnetic-pole part 42*a* (the circular arc surface 42*a'*), between the S-pole outer peripheral surface 41*a'''* and the second magnetic-pole part 42*b* (the circular arc surface 42*b'*), between the protrusion part 41*c* (the end surface 41*c'*) and the end surface 42*a''* of the first magnetic-pole part 42*a*, and between the protrusion part 41*d* (the end surface 41*d'*) and the end surface 42*b'''* of the second magnetic-pole part 42*b*, so that the rotor 41 starts to rotate clockwise.

When the rotor 41 rotates clockwise, a repulsion force generated between the protrusion part 41*c* (the end surface 41*c'*) and the end surface 42*a''* of the first magnetic-pole part 42*a* and between the protrusion part 41*d* (the end surface 41*d'*) and the end surface 42*b'''* of the second magnetic-pole part 42*b* greatly acts until the rotor 41 reaches an intermediate position of a rotational range (a working angle) thereof. After the rotor 41 goes beyond the intermediate position of the rotational range, an attraction force generated between the protrusion part 41*c* (the end surface 41*c''*) and the end surface 42*b''* of the second magnetic-pole part 42*b* and between the protrusion part 41*d* (the end surface 41*d''*) and the end surface 42*a'''* of the first magnetic-pole part 42*a* greatly acts. Therefore, the rotor 41 continues to rotate while maintaining a stable rotational force, and, as shown in FIG. 8C, the rotor 41 is positioned and stopped by the stopper (not shown) at the clockwise rotational end.

When an electric current stops being passed through the coil 43 in this state, a magnetic attraction force generated between the protrusion part 41*c* (the end surface 41*c''*) and the end surface 42*b''* of the second magnetic-pole part 42*b* and between the protrusion part 41*d* (the end surface 41*d''*) and the end surface 42*a'''* of the first magnetic-pole part 42*a* acts, and a magnetic attraction force generated between the N-pole outer peripheral surface 41*a''* and the second magnetic-pole part 42*b* (the circular arc surface 42*b'*) and between the S-pole outer peripheral surface 41*a'''* and the first magnetic-pole part 42*a* (the circular arc surface 42*a'*) acts as shown in FIG. 8D. As a result, the rotor 41 is reliably held at the clockwise rotational end.

This state corresponds to a state in which the blade member 30 is set at the position retreating from the apertures 10*a* and 20*a*, as shown in FIG. 6, in the camera blade driving device.

On the other hand, when an electric current is passed through the coil 43 in an opposite direction, an opposite magnetic pole is generated in each of the first and second magnetic-pole parts 42*a* and 42*b*. Accordingly, the rotor 41 stably rotates in the counterclockwise direction while following an opposite path from the state of FIG. 8D, and is positioned and held at the counterclockwise rotational end shown in FIG. 8A.

At this time, in the camera blade driving device, the blade member 30 is moved from the position retreating from the apertures 10*a* and 20*a* shown in FIG. 6 to the position facing the apertures 10*a* and 20*a* shown in FIG. 5, and is positioned.

Since the rotor 41 is provided with the protrusion parts 41*c* and 41*d* magnetized into the same magnetic poles as the N-pole and S-pole outer peripheral surfaces 41*a''* and 41*a'''*, respectively, as described above, the rotor 41 can obtain a more stable rotational force and a more stable and greater driving torque by means of the driving pin 41*b*. Additionally, the rotor 41 can generate a desired maintaining force (i.e., a magnetic attraction force) at the rotational ends on both sides thereof. Still additionally, when the electromagnetic actuator 40' is used as a driving source for the camera blade driving device, the blade member 30 can be driven smoothly and stably.

FIG. 9 to FIG. 10D show still another embodiment of the electromagnetic actuator according to the present invention. This embodiment is the same as the above-described embodiment shown in FIG. 4A to FIG. 4D, except that the rotor and the yoke are partially modified. Therefore, the same reference character is given to the same structure as in the above-described embodiment, and a description of the same structure is omitted.

As shown in FIG. 9, in this electromagnetic actuator 40'', the rotor 41 is provided with two protrusion parts 41*e* and 41*f* protruded from two boundary areas of the N-pole outer peripheral surface 41*a''* and the S-pole outer peripheral surface 41*a'''*.

The protrusion part 41*e* is formed to face the circular arc surface 42*a'* of the first magnetic-pole part 42*a*, and the protrusion part 41*f* is formed to face the circular arc surface 42*b'* of the second magnetic-pole part 42*b*. When the rotor 41 is positioned at the center of the working angle, the protrusion part 41*e* is positioned at the center of the circular arc surface 42*a'*, and the protrusion part 41*f* is positioned at the center of the circular arc surface 42*b'*. Each of the protrusion parts 41*e* and 41*f* is magnetized to have two magnetic poles (i.e., N-pole and S-pole).

The operation of the electromagnetic actuator 40'' will be described with reference to FIG. 10A or FIG. 10D.

First, when the rotor 41 is situated at the counterclockwise rotational end in a state of not energizing the coil 43 as shown in FIG. 10A, the rotor 41 is in contact with the stopper at a position where the boundary line between the magnetic poles of the magnetized rotor part 41*a* deviates from the intermediate position of each of the circular arc surfaces 42*a'* and 42*b'*. Therefore, a magnetic attraction force is generated between the N-pole outer peripheral surface 41*a''* and the first magnetic-pole part 42*a* (the circular arc surface 42*a'*), between the S-pole outer peripheral surface 41*a'''* and the second magnetic-pole part 42*b* (the circular arc surface 42*b'*), between the protrusion part 41*e* and the circular arc surface 42*a'* of the first magnetic-pole part 42*a*, and between the protrusion part 41*f* and the circular arc surface 42*b'* of the second magnetic-pole part 42*b*. Therefore, the rotor 41 is positioned by the stopper (not shown) at the counterclockwise rotational end, and is reliably held thereby.

This state corresponds to a state in which the blade member 30 is set at a position facing the apertures 10*a* and 20*a*, as shown in FIG. 5, in the camera blade driving device.

When an electric current is passed through the coil 43 in a predetermined direction in this state, an N-pole is generated in the first magnetic-pole part 42*a*, and an S-pole is generated in the second magnetic-pole part 42*b* as shown in FIG. 10B.

Accordingly, a repulsion force is generated by an electromagnetic force between the N-pole outer peripheral surface 41*a''* and the first magnetic-pole part 42*a* (the circular arc surface 42*a'*) and between the S-pole outer peripheral surface 41*a'''* and the second magnetic-pole part 42*b* (the circular arc surface 42*b'*), so that the rotor 41 starts to rotate clockwise.

The rotor 41 rotates clockwise, and is positioned and stopped by the stopper (not shown) at the clockwise rotational end in a state in which the boundary line between the magnetic poles of the magnetized rotor part 41*a* deviates from the intermediate position of each of the circular arc surfaces 42*a*' and 42*b*' as shown in FIG. 10C.

When an electric current stops being passed through the coil 43 in this state, a magnetic attraction force generated between the protrusion part 41*e* and the circular arc surface 42*a*' of the first magnetic-pole part 42*a* and between the protrusion part 41*f* and the circular arc surface 42*b*' of the second magnetic-pole part 42*b* acts, and a magnetic attraction force generated between the N-pole outer peripheral surface 41*a*" and the second magnetic-pole part 42*b* (the circular arc surface 42*b*') and between the S-pole outer peripheral surface 41*a*'" and the first magnetic-pole part 42*a* (the circular arc surface 42*a*') acts. As a result, the rotor 41 is reliably held at the clockwise rotational end as shown in FIG. 10D.

This state corresponds to a state in which the blade member 30 is set at the position retreating from the apertures 10*a* and 20*a*, as shown in FIG. 6, in the camera blade driving device.

On the other hand, when an electric current is passed through the coil 43 in an opposite direction, an opposite magnetic pole is generated in each of the first and second magnetic-pole parts 42*a* and 42*b*. Accordingly, the rotor 41 stably rotates in the counterclockwise direction while following an opposite path from the state of FIG. 10D, and is positioned and held at the counterclockwise rotational end shown in FIG. 10A.

At this time, in the camera blade driving device, the blade member 30 is moved from the position retreating from the apertures 10*a* and 20*a* shown in FIG. 6 to the position facing the apertures 10*a* and 20*a* shown in FIG. 5, and is positioned.

As in the above-described embodiments, the rotor 41 is provided with the two protrusion parts 41*e* and 41*f* on the circumferential surface thereof in order to enlarge the facing areas of the magnetic-pole parts 42*a* and 42*b* in this embodiment, and hence the rotor 41 especially can generate a desired maintaining force (i.e., a magnetic attraction force) at the rotational ends on both sides. Therefore, when the electromagnetic actuator 40" is used as a driving source for the camera blade driving device, the blade member 30 can be reliably held and set at a predetermined stop position.

Additionally, since the driving pin 41*b* is not magnetized, the rotor 41 can be reduced in size in the direction of the rotational axis as in the above-described embodiments.

In the above-described embodiments, the camera blade driving device that employs the electromagnetic actuators 40, 40', and 40" according to the present invention is used as a driving source for driving the single blade member 30. However, without being limited to this, the electromagnetic actuator according to the present invention may be employed as a driving source for driving a plurality of blade members.

As described above, according to the electromagnetic actuator of the present invention, the surface of the rotor facing the yoke is increased, as a whole, by providing the protrusion parts that are protruded radially in the outward direction from the outer peripheral surface of the rotor, that are magnetized to have the same magnetic pole as the outer peripheral surface of the rotor, and that face the first magnetic-pole part and the second magnetic-pole part of the yoke. Therefore, it is possible to obtain an electromagnetic actuator that generates a desired maintaining force and a driving torque, in spite of the fact that the electromagnetic actuator is reduced in size.

Additionally, according to the camera blade driving device of the present invention, the above-described electromagnetic actuator is employed as a driving source, and hence a sufficient driving torque can be obtained by the rotor, in spite of being reduced in size. Therefore, the blade member (for example, a shutter blade, a diaphragm blade, an ND filter blade, or other filter blades) can be reliably and stably driven at a desired timing, and can be held at a desired position (i.e., a position facing the apertures or a position retreating from the apertures).

As described above, the electromagnetic actuator of the present invention can be reduced in size, and, in addition, can generate a desired maintaining force and a desired driving torque. Therefore, the electromagnetic actuator of the present invention can, of course, be used as a driving source for the camera blade driving device, and is useful as a driving source for other optical devices or electronic devices that are required to reciprocate a driven member.

What is claimed is:

1. An electromagnetic actuator comprising:
    a rotor that has a cylindrical outer peripheral surface and that is capable of rotating within a predetermined angular range;
    a magnetizing coil; and
    a U-shaped yoke that has a first magnetic-pole part defining a first circular arc surface and a first end surface, and a second magnetic-pole part defining a second circular arc surface and a second end surface, the first and second circular arc surfaces facing the outer peripheral surface of the rotor in a radial direction of the rotor, and the first and second end surfaces facing in a circumferential direction of the rotor so as not to face the outer peripheral surface of the rotor, the first and second magnetic-pole parts generating mutually different magnetic poles by energizing the coil;
    wherein the rotor includes:
    a magnetized rotor part that defines the outer peripheral surface of the rotor and faces the first and second circular arc surfaces in the radial direction of the rotor so as to generate a magnetic action, and that is magnetized to have different magnetic pole portions at different locations along the circumferential direction, said different magnetic pole portions including a first magnetic pole portion having a first magnetic pole and a second magnetic pole portion having a second magnetic pole different than said first magnetic pole;
    a driving pin that is not magnetized and is configured so as to rotate together with the magnetized rotor part; and
    a protrusion part that is protruded in a radial direction from said outer peripheral surface of the magnetized rotor part, said protrusion part being magnetized to have the same magnetic pole as a portion of the outer peripheral surface from which said protrusion part radially protrudes, wherein said protrusion part is formed so as to rotate together with said magnetized rotor part and is formed so as to be able to face the first end surface of the first magnetic-pole part or the second end surface of the second magnetic-pole part in the circumferential direction so as to generate a magnetic action.

2. The electromagnetic actuator as set forth in claim 1, wherein
    the magnetized rotor part has an N-pole outer peripheral surface portion and an S-pole outer peripheral surface portion that are obtained by having the outer peripheral surface bisected in the circumferential direction, and the protrusion part is formed to be protruded from one of the N-pole outer peripheral surface portion and the S-pole outer peripheral surface portion.

3. The electromagnetic actuator as set forth in claim 1, wherein
the magnetized rotor part has an N-pole outer peripheral surface portion and an S-pole outer peripheral surface portion that are obtained by having the outer peripheral surface bisected in the circumferential direction, and the protrusion part is formed to be protruded from both the N-pole outer peripheral surface portion and the S-pole outer peripheral surface portion.

4. The electromagnetic actuator as set forth in claim 1, wherein
the magnetized rotor part has an N-pole outer peripheral surface portion and an S-pole outer peripheral surface portion that are obtained by having the outer peripheral surface bisected in the circumferential direction, and the protrusion part is formed to be protruded from two boundary areas of the N-pole and S-pole outer peripheral surface portions.

5. A camera blade driving device comprising:
a base plate having an exposure aperture;
a blade member provided so as to be movable between a position facing the aperture and a position retreating from the aperture; and
a driving source that drives the blade member;
wherein the driving source is an electromagnetic actuator, the electromagnetic actuator including:
a rotor that has a cylindrical outer peripheral surface and that is capable of rotating within a predetermined angular range;
a magnetizing coil; and
a U-shaped yoke that has a first magnetic-pole part defining a first circular arc surface and a first end surface, and a second magnetic-pole part defining a second circular arc surface and a second end surface, the first and second circular arc surfaces facing the outer peripheral surface of the rotor in a radial direction of the rotor, and the first and second end surfaces facing in a circumferential direction of the rotor so as not to face the outer peripheral surface of the rotor, the first and second magnetic-pole parts generating mutually different magnetic poles by energizing the coil;
wherein the rotor includes:
a magnetized rotor part that defines the outer peripheral surface of the rotor and faces the first and second circular arc surfaces in the radial direction of the rotor so as to generate a magnetic action, and that is magnetized to have different magnetic pole portions at different locations along the circumferential direction, said different magnetic pole portions including a first magnetic pole portion having a first magnetic pole and a second magnetic pole portion having a second magnetic pole different than said first magnetic pole;
a driving pin that is not magnetized and is configured so as to rotate together with the magnetized rotor part; and
a protrusion part that is protruded in a radial direction from said outer peripheral surface of the magnetized rotor part, said protrusion part being magnetized to have the same magnetic pole as a portion of the outer peripheral surface from which said protrusion part radially protrudes, wherein said protrusion part is formed so as to rotate together with said magnetized rotor part and is formed so as to be able to face the first end surface of the first magnetic-pole part or the second end surface of the second magnetic-pole part in the circumferential direction so as to generate a magnetic action.

6. The electromagnetic actuator as set forth in claim 1, wherein
said driving pin constitutes a rotational limiter configured to limit rotation of said rotor to within a rotary angular range having a first rotational end and a second rotational end.

7. The electromagnetic actuator as set forth in claim 6, wherein
said rotor and said yoke are configured such that, when said rotor is rotationally positioned at said first rotational end, said protrusion part faces said first magnetic pole part without contacting said first magnetic pole part and, when said rotor is rotationally positioned at said second rotational end, said protrusion part faces said second magnetic pole part without contacting said second magnetic pole part.

8. The electromagnetic actuator as set forth in claim 6, wherein
said rotor and said yoke are configured such that, when said rotor is rotationally positioned at said first rotational end, said protrusion part faces said first magnetic pole part and, when said rotor is rotationally positioned at said second rotational end, said protrusion part faces said second magnetic pole part.

9. The electromagnetic actuator as set forth in claim 1, wherein
said protrusion part is rotatable together with said magnetized rotor part in such a manner as to rotate between a first rotational end position, in which said protrusion part faces said first magnetic pole part without contacting said first magnetic pole part, and a second rotational end position in which said protrusion part faces said second magnetic pole part without contacting said second magnetic pole part.

10. The camera blade driving device as set forth in claim 5, wherein
said driving pin constitutes a rotational limiter configured to limit rotation of said rotor to within a rotary angular range having a first rotational end and a second rotational end.

11. The camera blade driving device as set forth in claim 10, wherein
said rotor and said yoke are configured such that, when said rotor is rotationally positioned at said first rotational end, said protrusion part faces said first magnetic pole part without contacting said first magnetic pole part and, when said rotor is rotationally positioned at said second rotational end, said protrusion part faces said second magnetic pole part without contacting said second magnetic pole part.

12. The camera blade driving device as set forth in claim 10, wherein
said rotor and said yoke are configured such that, when said rotor is rotationally positioned at said first rotational end, said protrusion part faces said first magnetic pole part and, when said rotor is rotationally positioned at said second rotational end, said protrusion part faces said second magnetic pole part.

13. The camera blade driving device as set forth in claim 5, wherein
said protrusion part is rotatable together with said magnetized rotor part in such a manner as to rotate between a first rotational end position, in which said protrusion part faces said first magnetic pole part without contacting said first magnetic pole part, and a second rotational end position in which said protrusion part faces said second magnetic pole part without contacting said second magnetic pole part.

14. The electromagnetic actuator as set forth in claim 1, wherein said protrusion part has an end surface facing radially outwardly of said rotor, and a pair of mutually oppositely facing side surfaces facing in a circumferential direction of said rotor; and said protrusion part is configured so that one of said mutually oppositely facing side surfaces is able to face the first end surface of the first magnetic pole part, and so that the other of said mutually oppositely facing side surfaces is able to face the second end surface of the second magnetic pole part.

15. The camera blade driving device as set forth in claim 5, wherein said protrusion part has an end surface facing radially outwardly of said rotor, and a pair of mutually oppositely facing side surfaces facing in a circumferential direction of said rotor; and said protrusion part is configured so that one of said mutually oppositely facing side surfaces is able to face the first end surface of the first magnetic pole part, and so that the other of said mutually oppositely facing side surfaces is able to face the second end surface of the second magnetic pole part.

* * * * *